Sept. 27, 1966 SATOSHI SHIMADA 3,275,920

HIGH VOLTAGE SUPPLY CIRCUIT

Filed Oct. 29, 1962

Inventor

Satoshi Shimada by

Hill Sherman Meroni Gross & Simpson

Attys.

United States Patent Office 3,275,920
Patented Sept. 27, 1966

3,275,920
HIGH VOLTAGE SUPPLY CIRCUIT

Satoshi Shimada, Tokyo, Japan, assignor to Sony Corporation, Tokyo, Japan, a corporation of Japan

Filed Oct. 29, 1962, Ser. No. 233,725
Claims priority, application Japan, Oct. 30, 1961, 36/54,256
4 Claims. (Cl. 321—8)

This invention relates to a direct current high voltage supply circuit and more particularly to a circuit having a specially constructed transformer wherein the distributed capacitance of a winding thereof is reduced, and also the stray capacitance formed between an alternating current high potential portion thereof and an alternating current ground portion thereabout.

One object of this invention is to provide a direct current high voltage supply circuit usable as a combined flyback transformer and rectifier circuit of a television receiving set.

Another object of this invention is to provide a direct current high voltage supply circuit which is simple, compact and efficient.

A further object of this invention is to provide a direct current high voltage supply circuit having a transformer, the secondary or high tension side of which has not only a reduced distributed capacitance in itself but also a small stray capacitance formed between an alternating current high potential portion thereof and an alternating current ground portion thereabout, thereby reducing power transmission loss at high frequencies.

A still further object of this invention is to provide a transformer usable as a highly efficient flyback transformer for a television receiving set and in combination with a rectifier as a high voltage supply for the set.

Other objects, features and advantages of this invention will become more fully apparent from the following detailed description taken in conjunction with the accompanying drawings which illustrate preferred embodiments and in which.

Figure 1:
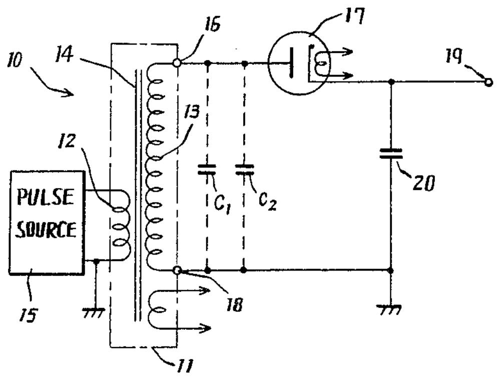
FIGURE 1 is a circuit diagram illustrating a direct current high voltage supply circuit heretofore employed.

An example of a direct current high voltage supply circuit heretofore used is indicated by reference numeral 10 in FIGURE 1. A transformer 11 is provided having a primary winding 12 and a secondary winding 13 wound on a core 14 of magnetic material. The primary winding 12 is connected to an alternating current power source, such as a pulse voltage supply circuit employed in the horizontal deflection circuit of a television receiver. One end 16 of the secondary winding 13 is connected to the anode of a rectifier 17 and the other end 18 is grounded, so that a high voltage is developed between a terminal 19 connected to the cathode of the rectifier 17 and ground, the terminal 19 being connected to ground through a capacitor 20.

In order to obtain a direct current high voltage such as, for example, 5–10 kv., it is required to make sufficiently large the winding ratio of the secondary winding 13 to the primary winding 12 of the transformer 11. Because of the large number of turns thus required in the secondary winding 13, a distributed capacitance $C_1$ of the secondary winding 13 by itself and a stray capacitance $C_2$ between the alternating current high potential portion of the winding 13 and the ground potential portion theerabout are electrically inserted in parallel to the winding 13, equivalently, both being of relatively high values. Therefore, the product of the inductance L of the winding 13 and its parallel capacitance $(C_1+C_2)$ is large and the resonant frequency $f_0$ of the secondary winding 13 is low. Because of the low resonant frequency, the width or duration of high voltage pulses applied to the rectifier is large and the peak value of the voltage is low. Further, the pulse waveform is deformed and causes undesirable energy loss owing to the large capacitances, and hence a high voltage cannot be obtained effectively.

Figure 2:
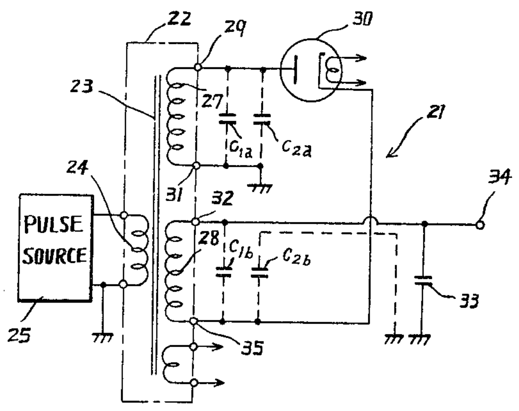
FIGURE 2 is a circuit diagram illustrating one embodiment of a direct current high voltage supply circuit according to this invention.

FIGURE 2 shows one embodiment of a high voltage supply circuit constructed according to this invention, generally designated by reference numeral 21. The circuit 21 comprises a transformer 22 having a core 23 on which is wound a primary winding 24 connected to a voltage supply circuit 25, preferably a pulse supply circuit such as employed in the horizontal deflection circuit of a television receiver with the transformer 22 being thus used as a flyback transformer. The transformer 22 includes a secondary winding which is divided in two to provide two split windings 27 and 28. One end 29 of the winding 27 is connected to the anode of a rectifier 30 while the other end 31 thereof is grounded. To one end 32 of the winding 28 is connected one end of an external capacitor 33 and an output terminal 34, the other end of the capacitor 33 being grounded and the other end 35 of the winding 28 being connected to the cathode of the rectifier 30. With this arrangement, the sum of voltages respectively obtained across the windings 27 and 28 is applied across the anode and the cathode of the rectifier 30, in series with the capacitor 33.

In operation, current flows from ground through the terminal 31, the winding 27, the terminal 29, the rectifier 30, the terminal 35, the winding 28, the terminal 32 and the capacitor 33 to ground, so that a rectified voltage is obtained at the terminal 34. This voltage is substantially the same as that mentioned in connection with the example of FIGURE 1, but since the secondary winding is divided in two, the respective inductances of the windings 27 and 28 become about $(1/2)^2$ of that which would otherwise be the case with a single winding and the distributed capacitances and the stray capacitances $C_{1a}$, $C_{2a}$ and $C_{1b}$, $C_{2b}$ of the windings electrically connected equivalently in parallel to the windings 27 and 28 are respectively reduced substantially by half. Accordingly, the product of the total inductance and the capacitance is lowered to $(1/2)^3$, so that a high voltage rectifying pulse is developed having a high peak value and a narrow duration or width, and thus a high voltage can effectively be obtained.

Figure 3:
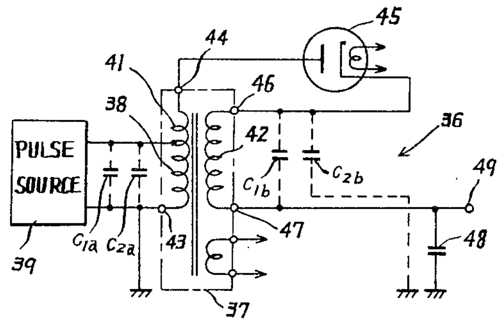
FIGURE 3 is a circuit diagram showing another embodiment of a high voltage supply circuit according to this invention.

FIGURE 3 illustrates another embodiment of a high voltage supply circuit constructed according to this invention, generally designated by reference numeral 36. The circuit 36 comprises a transformer 37 including a primary winding 38 connected to a voltage supply circuit 39, preferably a pulse supply circuit such as employed in the horizontal deflection circuit of a television receiver with the transformer 37 being used as a flyback transformer. As is the case with the transformer 22 of the circuit of FIGURE 2, a secondary winding is provided which is divided in two to form split windings 41 and 42.

However, unlike the transformer 22 of FIGURE 2, one of the windings, in this case the winding 41, is formed and connected as an extension of the primary winding 38, with one end of the combined winding thus formed, terminal 43 of the winding 38, being grounded and with the other end of the combined windings, terminal 44 of the winding 41, being connected to the anode of a rectifier 45. The cathode of the rectifier 45 is connected to one terminal 46 of the winding 42 while the other terminal 47 of the winding 42 is connected through a capacitor 48 to ground and to an output terminal 49. The combination of the windings 38, 41 corresponds to the winding 27 of the transformer 22 of FIGURE 2, and the winding 42 corresponds to the winding 28, and the operation of the circuit and its advantages are substantially the same as with the circuit of FIGURE 2. Accordingly, the distributed and stray capacitances are indicated by the same reference characters.

Figure 4:
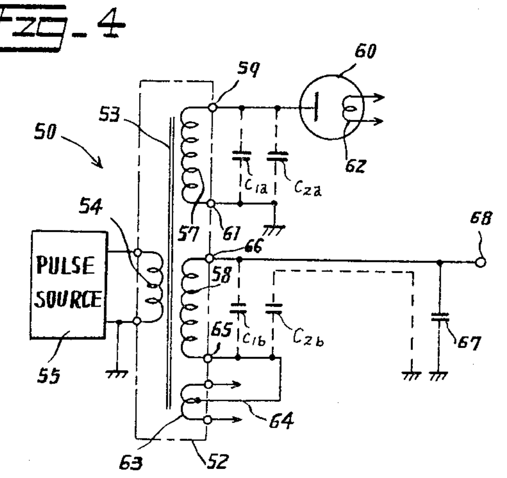
FIGURE 4 is a circuit diagram showing still another embodiment of high voltage supply circuit constructed according to this invention.

FIGURE 4 shows another embodiment of a high voltage supply circuit constructed according to this invention, generally designated by reference numeral 50. The circuit 50 comprises a transformer 52 very similar to the transformer 22 in the circuit of FIGURE 2, including a core 53, a primary 54 connected to a current source 55, and secondary windings 57 and 58. One terminal 59 of the secondary winding 57 is connected to the anode of a rectifier 60 while the other terminal 61 of the winding 57 is grounded. In this circuit, unlike that illustrated in FIGURE 2, the rectifier 60 has a directly heated cathode 62 connected to a center-tapped winding 63 of the transformer 52. The center tap 64 of the winding 63 is connected to one terminal 65 of the secondary winding 58, while the other terminal 66 of the winding 58 is connected through a capacitor 67 to ground, and also to an output terminal 68. It will be appreciated that the operation and advantages of this circuit are substantially the same as obtained with the circuit of FIGURE 2, the only difference being in the use of the rectifier 60 having the directly heated cathode 62 and the connection to the center tap 64 of the winding 63, rather than to the indirectly heated cathode as in the case with the circuit of FIGURE 2.

Figure 5:
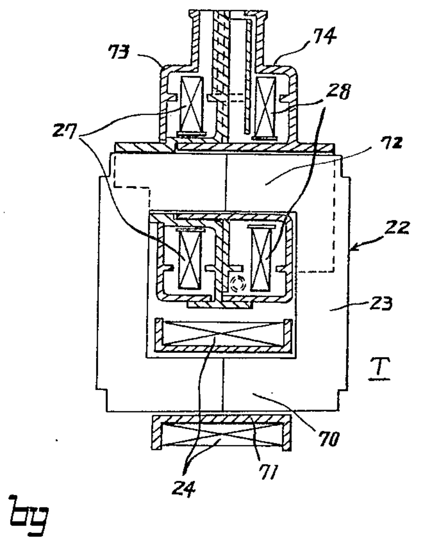
FIGURE 5 is a view partly in section illustrating a transformer constructed according to this invention, usable in the circuits of FIGURES 2, 3 and 4.
Figure 6:
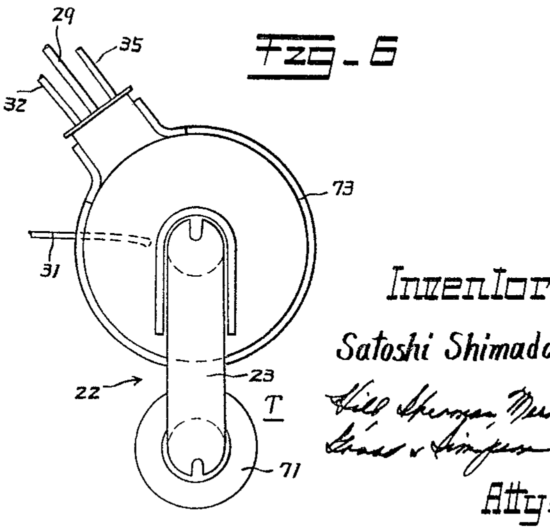
FIGURE 6 is a side elevational view of the transformer of FIGURE 5.

FIGURE 5 shows the construction of the transformer 22, used in the circuit of FIGURE 2, it being understood that the transformers 37 and 52 of FIGURES 3 and 4 may have substantially the same construction. As illustrated, the core 23 of the transformer is of rectangular shape and may be assembled from suitable members of magnetic material in conventional fashion. The primary winding 24 is disposed about one leg 70 of the core 23, on an insulated bobbin 71, while the split secondary windings 27 and 28 are disposed in spaced relation about a second leg 72 of the core, on and within combined bobbin and housing assemblies 73 and 74. The side elevational view of FIGURE 6 shows the positioning of the high voltage terminals or lead wires 29, 31, 32 and 35. Such terminals should be kept away from the core 23 as far as possible to minimize stray capacitances.

It is noted that although the illustrated embodiments of the invention use vacuum tube rectifiers in conjunction with windings divided into two equal portions, the invention is not limited to the use of vacuum tube rectifiers and may be used in conjunction with semi-conductor devices or other forms of rectifiers, and the invention is not necessarily limited to the use of two secondary windings or to the use of windings having equal numbers of turns. The invention is particularly advantageous when used in a direct current high voltage supply circuit of a television receiver.

It will be understood that modifications and variations may be effected without departing from the spirit and scope of the novel concepts of this invention.

I claim as my invention:

1. In a high voltage supply circuit, a transformer having a primary winding and two secondary windings each having a pair of end terminals, a rectifier connected between one terminal of one of said secondary windings and one terminal of the other of said secondary windings, the other terminals of said windings being each connected to a respective side of a load, the product of the inductance and stray capacitance to ground of each of said secondary windings being thereby substantially less than the product of the inductance and strap capacitance of a winding having a number of turns equal to the total of the number of turns of said secondary windings, to increase the frequency range of operation and efficiency of the circuit.

2. In a high voltage supply circuit, a transformer having a primary winding and two secondary windings each having a pair of end terminals, one of said secondary windings being formed as an extension of said primary winding, a rectifier connected between one terminal of one of said secondary windings and one terminal of the other of said secondary windings, the other terminals of said secondary windings being each connected to a respective side of a load.

3. In a high voltage supply circuit, a transformer having a primary winding and two secondary windings each having a pair of end terminals, a rectifier connected between one terminal of one of said secondary windings and one terminal of the other of said secondary windings, means for connecting the other terminal of said one of said secondary windings to ground, and an output terminal connected to the other terminal of said other of said secondary windings.

4. In a high voltage supply circuit for a television receiver including a source of horizontal pulses, a flyback transformer having a primary winding connected to said source and having two secondary windings each having a pair of end terminals, a rectifier connected between one terminal of one of said secondary windings and one terminal of the other of said secondary windings, means for connecting the other terminal of said one of said secondary windings to ground, a capacitor connected between ground and the other terminal of said other of said secondary windings, and means for connecting said other terminal of said other of said secondary windings to supply high voltage to the television receiver circuit the product of the inductance and stray capacitance to ground of each of said secondary windings being thereby substantially less than the product of the inductance and stray capacitance of a winding having a number of turns equal to the total of the number of turns of said secondary windings, to reduce the fly back time interval and increase the output voltage of the circuit.

References Cited by the Examiner

UNITED STATES PATENTS

| | | | |
|---|---|---|---|
| 2,121,421 | 6/1938 | Burt | 321—2 |
| 2,439,223 | 4/1948 | Schade | 321—15 X |
| 2,523,108 | 9/1950 | Friend | 321—15 X |
| 2,722,679 | 11/1955 | Barr | 321—15 X |
| 2,825,850 | 4/1958 | Iden | 336—30 X |
| 2,997,622 | 8/1961 | Claypool | 321—2 |

FOREIGN PATENTS

| | | |
|---|---|---|
| 291,871 | 12/1931 | Italy. |
| 769,126 | 2/1957 | Great Britain. |

JOHN F. COUCH, *Primary Examiner.*

LLOYD McCOLLUM, MILTON O. HIRSHFIELD, *Examiners.*

G. J. BUDOCK, J. C. SQUILLARO, W. H. BEHA, *Assistant Examiners.*